(12) United States Patent
Funck

(10) Patent No.: US 10,330,509 B2
(45) Date of Patent: Jun. 25, 2019

(54) METHOD AND ARRANGEMENT FOR AN ULTRASOUND CLAMP-ON FLOW MEASUREMENT AND CIRCUIT ARRANGEMENT FOR CONTROL OF AN ULTRASOUND CLAMP-ON FLOW MEASUREMENT

(71) Applicant: FLEXIM FLEXIBLE INDUSTRIEMESSTECHNIK GMBH, Berlin (DE)

(72) Inventor: Bernhard Funck, Rostock (DE)

(73) Assignee: Flexim Flexible Industriemesstechnik GmbH, Berlin (DE)

( * ) Notice: Subject to any disclaimer, the term of this patent is extended or adjusted under 35 U.S.C. 154(b) by 48 days.

(21) Appl. No.: 15/520,619

(22) PCT Filed: Oct. 19, 2015

(86) PCT No.: PCT/EP2015/074160
§ 371 (c)(1),
(2) Date: Apr. 20, 2017

(87) PCT Pub. No.: WO2016/062668
PCT Pub. Date: Apr. 28, 2016

(65) Prior Publication Data
US 2017/0307427 A1    Oct. 26, 2017

(30) Foreign Application Priority Data
Oct. 20, 2014   (DE) .................. 10 2014 115 203

(51) Int. Cl.
*G01F 1/66* (2006.01)
*G01P 5/14* (2006.01)
(Continued)

(52) U.S. Cl.
CPC .............. *G01F 1/667* (2013.01); *G01F 1/662* (2013.01); *G01F 25/0007* (2013.01); *G01P 5/245* (2013.01)

(58) Field of Classification Search
CPC ..................................... G01F 1/66; A61B 8/06
See application file for complete search history.

(56) References Cited

U.S. PATENT DOCUMENTS

| | | | |
|---|---|---|---|
| 4,015,470 A | | 4/1977 | Morrison |
| 4,754,650 A | * | 7/1988 | Smalling ................. G01F 1/662 73/861.28 |

(Continued)

FOREIGN PATENT DOCUMENTS

| | | |
|---|---|---|
| DE | 102 48 593 A1 | 4/2004 |
| DE | 10 2005 047 790 A1 | 4/2007 |

(Continued)

*Primary Examiner* — Jewel V Dowtin
(74) *Attorney, Agent, or Firm* — Muncy, Geissler, Olds & Lowe, P.C.

(57) ABSTRACT

The invention relates to a method and an arrangement for an ultrasound clamp-on flow measurement according to the transit-time method. The problem addressed by the invention is to provide a measurement arrangement for clamp-on flow measurement, which enables measurement using only two pairs of acoustic transducers in both reflection configuration and in X configuration, without requiring the acoustic transducer position to be changed when switching between configurations. For the method according to the invention, at least four acoustic transducers are arranged on a measurement pipe, which are controlled in such a way that the flow measurement is performed consecutively in an alternating manner in the X configuration and in the reflection configuration. For this purpose, two acoustic transducers are connected for each transmission-receiving pair for a flow measurement in X configuration, and/or two acoustic
(Continued)

transducers are connected for each transmission-receiving pair for two reflection configurations.

6 Claims, 4 Drawing Sheets

(51) Int. Cl.
    *G01F 25/00*     (2006.01)
    *G01P 5/24*     (2006.01)

(56) References Cited

U.S. PATENT DOCUMENTS

| | | |
|---|---|---|
| 5,440,937 A | 8/1995 | Lynnworth et al. |
| 5,533,408 A | 7/1996 | Oldenziel et al. |
| 6,293,156 B1 | 9/2001 | Shen et al. |
| 6,595,071 B1 * | 7/2003 | Doten .................. A61B 8/06 |
| | | 73/861.29 |
| 7,469,599 B2 | 12/2008 | Froehlich et al. |
| 8,019,559 B1 | 9/2011 | Stevens et al. |
| 8,104,359 B2 | 1/2012 | Wiest et al. |
| 8,234,934 B2 * | 8/2012 | Dietz .................. G01F 1/662 |
| | | 73/861.31 |
| 8,347,734 B2 | 1/2013 | Berger et al. |
| 9,453,749 B1 * | 9/2016 | Bachmann ........... G01F 15/00 |
| 9,874,466 B2 * | 1/2018 | Leaders ............... G01F 1/667 |
| 9,903,745 B2 * | 2/2018 | Drachmann .......... G01F 1/667 |
| 2011/0271769 A1 | 11/2011 | Kippersund et al. |
| 2013/0174669 A1 | 7/2013 | Sui et al. |
| 2014/0000339 A1 | 1/2014 | Funck |
| 2014/0109645 A1 | 4/2014 | Ramsay |

FOREIGN PATENT DOCUMENTS

| | | |
|---|---|---|
| DE | 10 2008 029 772 A1 | 12/2009 |
| DE | 10 2011 005 170 B4 | 10/2012 |
| DE | 10 2012 013 774 A1 | 1/2014 |
| EP | 1 736 741 A1 | 12/2006 |
| EP | 2 072 972 A1 | 6/2009 |
| JP | S 60-202310 A | 10/1985 |

* cited by examiner

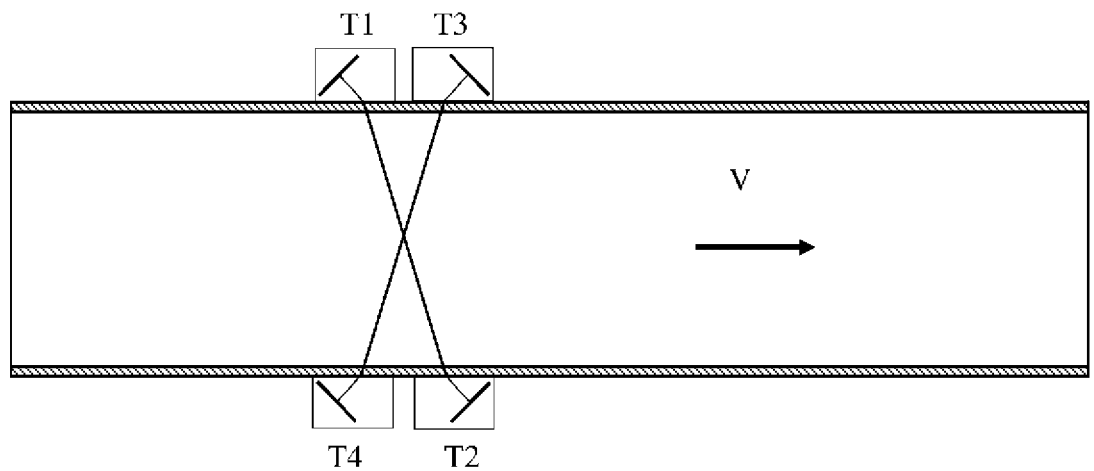
FIG. 1 - Prior art
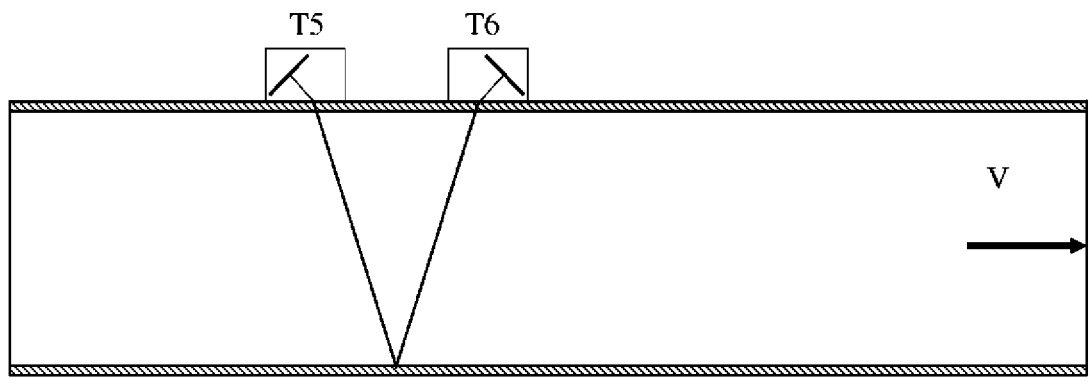
FIG. 2 - Prior art

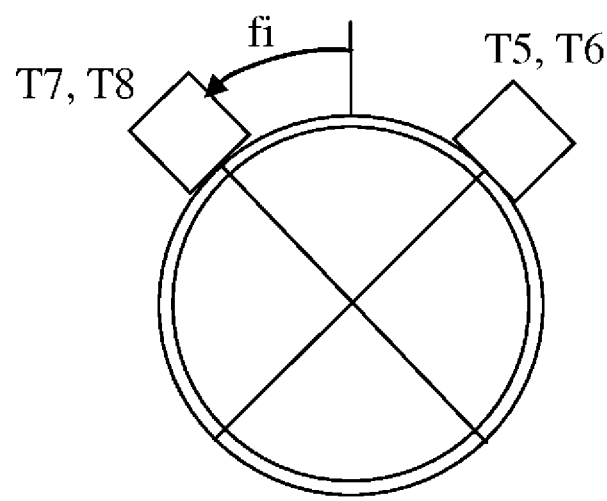
FIG. 3 - Prior art

METHOD AND ARRANGEMENT FOR AN ULTRASOUND CLAMP-ON FLOW MEASUREMENT AND CIRCUIT ARRANGEMENT FOR CONTROL OF AN ULTRASOUND CLAMP-ON FLOW MEASUREMENT

This nonprovisional application is a National Stage of International Application No. PCT/EP2015/074160, which was filed on Oct. 19, 2015, and which claims priority to German Patent Application No. 10 2014 115 203.4, which was filed in Germany on Oct. 20, 2014, and which are both herein incorporated by reference.

BACKGROUND OF THE INVENTION

Field of the Invention

The invention relates to a method and an arrangement for a clamp-on ultrasonic flow measurement according to the transit time method.

Description of the Background Art

Clamp-on flowmeters are widely used in many sectors of industry. One of their major advantages is that the flow measurement takes place without contact. In the case of clamp-on flowmeters according to the transit time method, the transit time difference of two sound signals propagating in or against the flow is measured and the volumetric flow rate is calculated therefrom. To this end, two acoustic transducers, both of which can be operated as a transmitter and as a receiver, are attached to the pipe wall. An acoustic transducer includes an active element such as, e.g., a piezo-ceramic, which is arranged on a so-called transducer wedge such that the sound propagation occurs at the angle of incidence alpha. The excitation pulses for the acoustic transducers are generated and the received signals of the acoustic transducers are evaluated in the measuring transducer. The latter provides a measuring channel for each acoustic transducer. The transit time difference dt depends on the average flow velocity Vl along the sound path, the transducer constants Ka, and the sound transit time t_fl in the fluid. The relationship is described by the following formula:

$$Vl = Ka * (dt/2t\_fl) \qquad \text{Eq. (1)}$$

In this case, Ka is the transducer constant that determines the angle of incidence in the fluid:

$$Ka = c\_alpha/\sin(alpha) \qquad \text{Eq. (2)}$$

Here, alpha and c_alpha are the angle of incidence and the sound velocity in the transducer wedge, respectively. To calculate the volumetric flow rate, the fluid mechanical calibration factor KF must be known, which represents the ratio of the area-averaged value of the flow velocity VA to the average flow velocity Vl along the sound path:

$$KF = VA/Vl \qquad \text{Eq. (3)}$$

The volumetric flow rate Q is then obtained with the cross-sectional area A of the pipe as:

$$Q = KF * A * Ka * (dt/2t\_fl) \qquad \text{Eq. (4)}$$

In the clamp-on flow measurement, diametrical sound paths are used; in other words, the two acoustic transducers required to generate a sound path are arranged on the pipe such that the sound path intersects the pipe axis. For this purpose, the acoustic transducers can be placed on opposite sides of the pipe. This then refers to the so-called direct configuration. If two direct configurations are arranged such that the sound paths cross, then the term X configuration is used (DE 102011005170 B4, DE 102005047790 A1). Alternatively, the reflection configuration is possible in which the acoustic transducers are placed on the same side of the measuring pipe and the sound signal is reflected once on the opposite inner side of the pipe (DE 102008029772 A1). The X configuration and the reflection configuration are shown in FIGS. 1 and 2.

In the following text, the one-time propagation from the pipe inner wall to the opposite pipe inner wall will be called the sound path. A single sound path is then realized with the direct configuration and two sound paths with the reflection configuration. In both configurations, the number of sound paths can be increased by multiple reflections on the pipe inner wall. In the reflection configuration, even sound path numbers are thereby possible, and in the direct configuration uneven sound path numbers are possible. The totality of all sound paths between the two acoustic transducers of a transducer pair is called the sound route. The advantage of increasing the number of sound paths is the lengthening of the sound route in the case of small pipes. The plane formed by the two sound paths of the X configuration or the reflection configuration is called the measuring plane.

The advantage of the reflection configuration is, among others, that non-axial components of the flow vector are largely compensated because they act on both single paths with the opposite sign. An undisturbed flow profile is assumed in the clamp-on flow measurement. This is the case in a sufficiently long straight entry section before the measuring point. The flow vector then lies in the direction of the pipe axis and therefore contains only the axial component Vax. The path average VL calculated using Eq. (1) is then identical to the path average of Vax. In practice, the inflow conditions are usually not ideal, however. The flow vector then contains in addition the cross-flow component Vcr (cross flow), which is oriented perpendicular to the pipe axis and lies in the plane formed by the pipe axis and the sound path. The cross-flow component has the following effect in the measured value of the path average Vl_1path of a single path in the direct configuration:

$$VL\_1path = Vax - Vcr[\cos(gamma)/\sin(gamma)] \qquad \text{Eq. (5)}$$

Here gamma is the propagation angle in the test medium measured versus the perpendicular to the pipe wall. In the reflection or X configuration, the effect of the transverse component is eliminated, if it is assumed that the cross flow does not change within the measuring volume. This stems from the fact that the angle gamma in Eq. (5) has an opposite sign for the two individual sound paths in the reflection or X configuration.

The reflection configuration is not always possible, however. The maximum measurable flow velocity is proportional to the sound route length, so that the direct configuration is selected, if the maximum measurable flow velocity in the reflection configuration is below the desired measuring range.

The reflection configuration in fact compensates for the cross-flow components of the flow vector, but detection of the cross-flow components is not possible with it. The X configuration shown in FIG. 1 is suitable for this. The cross flow is also compensated as in the reflection configuration in the average of the individual measurements in both sound paths. The value of the cross flow can be calculated moreover from the difference of the individual measurements. If the path averages VL_X1 and VL_X2 are measured in the two individual paths of the X configuration and the gamma angles in each case have an opposite sign but are identical in value, then the following is obtained with Eq. (5):

$$VI\_X1 - VI\_X2 = 2Vcr[\cos(\text{gamma})/\sin(\text{gamma})] \qquad \text{Eq. (6)}$$

Therefore, the cross-flow component is $$Vcr = 1/2[VI\_X1 - VI\_X2]/[\cos(\text{gamma})/\sin(\text{gamma})] \qquad \text{Eq. (7)}$$

The angle gamma is obtained according to Snell's law of refraction from the transducer constant Ka according to Eq. (2) and the sound velocity in the test medium.

The presence of a cross flow indicates a disturbance in the inflow conditions. The cross-flow detection therefore represents an additional diagnostic option.

Both configurations, the reflection and X configuration, therefore have their own advantages. To utilize the advantages of both configurations, in conventional technology both configurations had to be installed and operated by a measuring transducer. A reflection and X configuration together require three pairs of acoustic transducers and correspondingly a measuring transducer with six measuring channels. It would be desirable to realize both measurement configurations with as few acoustic transducers as possible.

Points of disturbance, such as, e.g., 90° curves, also produce an asymmetry in the flow profile, apart from the already indicated cross-flow components. The effect of asymmetries can be countered by using a plurality of measuring planes. Suitable for this are, e.g., two reflection configurations shown in FIG. 2, which are then offset from one another by 90° in the direction of the pipe circumference and are placed at the same axial position on the pipe. This is shown in FIG. 3. Likewise, two X configurations can be placed in two measuring planes. If the angle of the first measuring plane, said angle being measured in direction of the pipe circumference, is designated with fi, then the second measuring plane has the angle fi+90. Two cross-flow components Vcr_fi and Vcr_fi90 can measured thereby and the value Vcr_m and the angle teta_Vcr of the vector of the cross-flow component can be calculated therefrom:

$$Vcr\_m = \sqrt{(Vcr\_fi)^2 + (Vcr\_fi90)^2} \qquad \text{Eq. (8)}$$

$$teta\_Vcr = \arctan(Vcr\_fi/Vcr\_fi90) \qquad \text{Eq. (9)}$$

So as to realize both two reflection configurations and two X configurations, overall six pairs of acoustic transducers and accordingly 12 measuring channels in the measuring transducer are needed in conventional technology.

DE 10248593 A1 describes a configuration that makes it possible to realize various sound path numbers with a single acoustic transducer pair, without the position of the acoustic transducers on the pipe having to be changed according to the sound path number. The use of acoustic transducers with a large opening angle is realized by this. An acoustic transducer pair, which is installed on the pipe as a reflection configuration with two sound paths, can also receive the signals that travel on four sound paths with a triple reflection on the pipe inner wall. Only either the reflection configuration or the direct configuration, each with a different sound path number, is always realized thereby.

DE 102005047790 A1 describes a configuration, which enables two sound paths with three acoustic transducers and two measuring channels, in that two of the three acoustic transducers are connected in parallel and therefore excited simultaneously. Nevertheless, this has the disadvantage that the transit times on the two sound paths must differ sufficiently greatly, so that the two signals do not overlap too greatly and therefore remain separable from one another.

DE 102008029772 A1 describes a configuration with at least two sensors, in which at least one of the two sensors contains at least two acoustic transducers. At least two different sound paths can therefore be realized thereby with the same configuration. The advantage of the configuration is that no laborious adjustment of the sensor position to the sound velocity of the test medium is necessary. The acoustic transducers are disposed within the sensor so that different propagation angles for the corresponding sound paths arise in the medium and the sound path optimal for the specific test medium is selected during the diagnostic phase. The simultaneous realization of reflection and direct configurations is not possible by doing this.

Other ultrasonic flow measurement systems are known from the following publications, which nevertheless do not solve the described problem. Thus, U.S. Pat. No. 6,293,156 B1 describes an ultrasonic flow measurement system according to the cross-correlation method. A solution is claimed in which only one transmitting transducer and two receiving transducers are needed to produce two sound paths whose signals are correlated. US 2013/0174669 A1 discloses a flow measurement according to a transit time difference method, whereby either the transit time difference between the upstream and downstream signal on a path in a direct configuration (mode 1) or the transit time difference between the downstream signals on two paths in a direct configuration with a different path angle (mode 2) is determined. It is indicated as an advantage that at high flow velocities the downstream signals usually have a better quality than the upstream signals. Mode 1 is then used. If both modes can be used, the cross flow can be determined and therefore can be compensated. The configuration therefore allows the increase of the turndown ratio and the compensation of the cross flow, but not both simultaneously. The self-compensation of the cross flow, as it is realized in the reflection configuration, is not possible in this way.

U.S. Pat. No. 8,019,559 B1 describes a configuration, which enables either the measurement according to the transit time method or according to the Doppler method. Additionally, measurement paths between transducer pairs that are not associated (crosswise) are formed in U.S. Pat. No. 8,234,934 B2 by using the opening angle. Additional diagnostic values are obtained in this way, without additional transducers needing to be incorporated. U.S. Pat. No. 4,015,470 A realizes a combination of a perpendicular sound path for the sound velocity measurement and an oblique sound path for the flow measurement. A multipath flowmeter with non-diametrical measuring paths is disclosed in EP 2072972 A1, and US 20140109645 A1 claims a condition monitor for monitoring the function of the flow metering system. US 20110271769 A1 discloses the evaluation of the pipe wall signal in comparison with the fluid signal for the sound velocity measurement with use of Lamb waves. U.S. Pat. No. 5,533,408 A describes a combination of the transit time difference method with a correlation method, based on signals which are reflected by particles in the flowing fluid, and U.S. Pat. No. 5,440,937 A discloses a direct configuration for a transit time difference measurement.

SUMMARY OF THE INVENTION

The invention is based on the objective of providing a measurement configuration for clamp-on flow measurement, which enables measurement using only two pairs of acoustic transducers both in a reflection configuration and in an X configuration, without requiring the acoustic transducer position to be changed when switching between the configurations.

For the method of the invention, at least four acoustic transducers are arranged on a measurement pipe, which are controlled in such a way that the flow measurement is performed consecutively in an alternating method in the X configuration and in the reflection configurations. For this purpose, in each case two acoustic transducers are connected to form one transmit/receive pair each for a flow measurement in the X configuration or two acoustic transducers to form one transmit/receive pair each for two reflection configurations.

An average flow velocity and a cross-flow component are determined using the acoustic transducers arranged in this way, whereby the cross-flow component is stored as a diagnostic value and displayed, and a warning signal is generated when a predefined maximum value of the cross-flow component is exceeded.

In a further embodiment of the method, a first flow measurement is performed in the X configuration, in which at least one average flow velocity is determined. If the average flow velocity is lower than the maximum flow velocity allowable for the reflection configuration, a second flow measurement is performed in the reflection configuration, or if the determined flow velocity is greater than or equal to the maximum flow velocity allowable for the reflection configuration, the flow measurement is repeated in the X configuration.

The configuration of the invention for the ultrasonic clamp-on flow measurement contains at least four acoustic transducers, which are arranged diametrically opposite in pairs, on the measurement pipe. The flow measurement in the reflection configuration or in the X configuration is realized by a control unit. Depending on the control by the control unit, in each case two acoustic transducers form a transmit/receive pair for the flow measurement in two reflection configurations or in each case a transmit/receive pair for the flow measurement in the X configuration.

The circuit arrangement of the invention for controlling an ultrasonic clamp-on flow measurement contains at least four acoustic transducers, which are arranged on a measurement pipe. For this purpose, a signal transmitter is connected via four switching elements and an amplifier via four further switching elements to the acoustic transducers, whereby for a first measurement, the two acoustic transducers are connected to form one transmit/receive pair each, so that two acoustic transducers are wired as transmitting units and two acoustic transducers as receiving units for a flow measurement in the X configuration, and for a second flow measurement two acoustic transducers are each connected via the four switching elements to form one transmit/receive pair each for the flow measurement in the reflection configuration.

The advantage of the invention is that the advantages of the reflection configuration, namely, that the non-axial components of the flow vector are largely compensated, and of the X configuration, namely, a detection of the cross-flow components, are combined into one configuration.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows X configurations of acoustic transducers according to the prior art;

FIG. 2 shows reflection configuration of acoustic transducers according to the prior art;

FIG. 3 shows two reflection configurations, offset from one another by 90°, according to the prior art;

DETAILED DESCRIPTION

As already described, a reflection configuration of the acoustic transducers on the same side of the measurement pipe (two sound paths) or a direct configuration of the acoustic transducers on opposite sides of the pipe (a single sound path) or the combination of two direct configurations for the X configuration is used in the clamp-on flow measurement. Both the reflection and X configuration have their advantages and disadvantages. The possibility would therefore be desirable to operate both configurations in parallel, which could be implemented according to the prior art with three pairs of acoustic transducers. Six pairs of acoustic transducers and 12 measuring channels are then necessary to install this configuration in two measuring planes.

Figure 4:
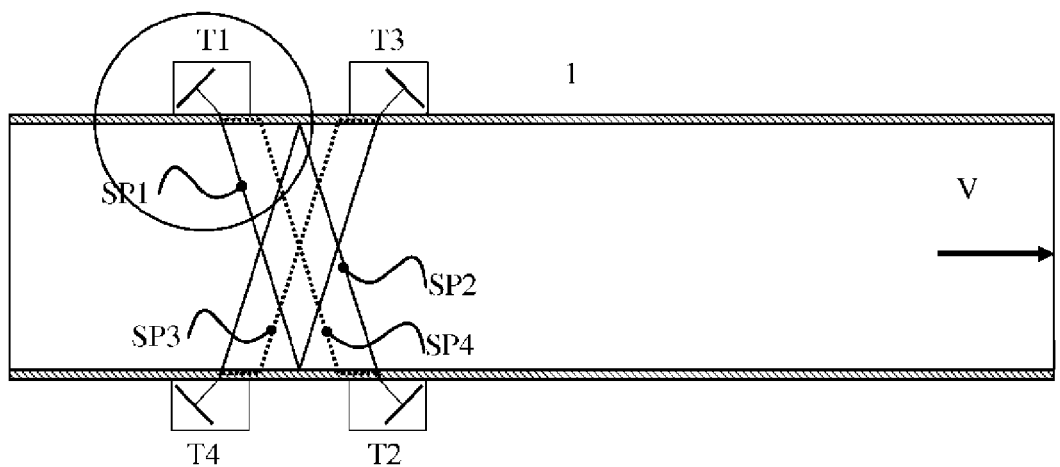
FIG. 4 shows an arrangement of two reflection configurations, according to the invention, on the measurement pipe.

The solution of the invention is that both methods are carried out with the same acoustic transducers; i.e., an X configuration is also realized with the sensor arrangement optimal for two reflection configurations. For this purpose, as shown in FIG. 4, two reflection configurations are installed at opposite positions on measurement pipe 1, through which a volumetric flow V flows. Bottom left acoustic transducer T4 is arranged on measuring pipe 1 diametrically opposite to top left acoustic transducer T1, and bottom right acoustic transducer T2 diametrically opposite to top right acoustic transducer T3. The first reflection configuration is realized between top left acoustic transducer T1 and top right acoustic transducer T3 with sound path SP1 and the second reflection configuration between bottom right acoustic transducer T2 and bottom left acoustic transducer T4 with sound path SP2. Sound paths SP1 and SP2 each contain a reflection on the pipe inner wall opposite to the acoustic transducers. The sound paths of both reflection configurations in this case lie in the same plane.

Figure 5:
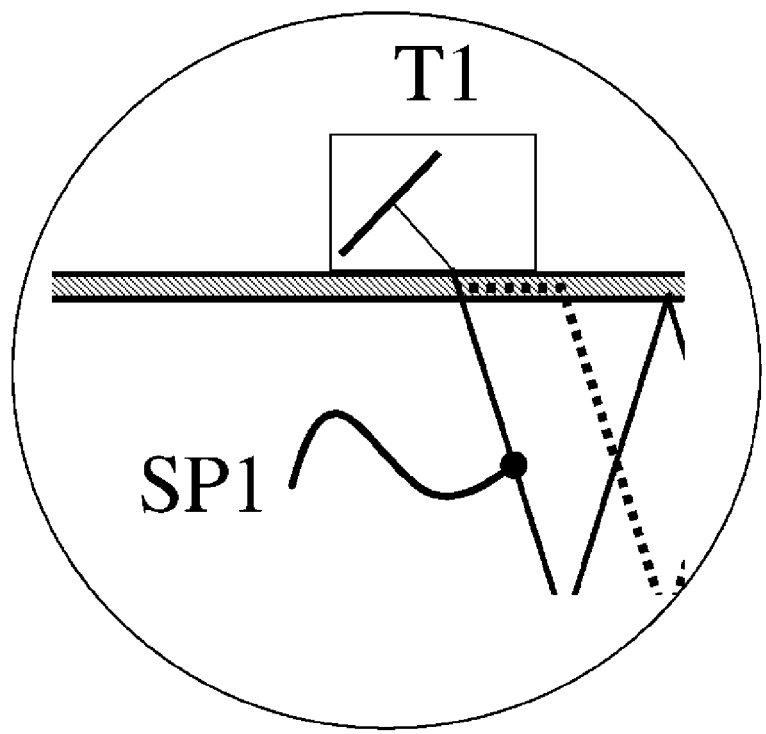
FIG. 5 shows a detail from FIG. 4.

To realize an X configuration with the same acoustic transducers T1 to T4, the distances between top left acoustic transducer T1 and top right acoustic transducer T3 and bottom right acoustic transducer T2 and bottom left acoustic transducer T4 in the direction of the pipe axis must be reduced. It emerged, however, that in particular when the surface wave modes of the pipe wall are used, a certain deviation of the transducer distance from the optimal value is possible. The sound traveling on sound paths SP3 and SP4 in the X configuration with use of surface wave modes is emitted from top left acoustic transducer T1 and top right acoustic transducer T3 into the pipe wall and propagates parallel to the pipe surface. During the propagation in the pipe wall, sound is emitted continuously into the medium. On the opposite side of the pipe wall after the impact, sound paths SP3 and SP4 also travel a distance parallel to the upper pipe surface to bottom right acoustic transducer T2 and bottom left acoustic transducer T4. As a result, a very broad acoustic beam forms in the medium. Alternatively, sound paths SP3 and SP4, shown as dashed lines in FIG. 4, can be used for calculating the transit time. FIG. 5 shows a detail from FIG. 4, in which the course of sound path SP4 in the pipe at top left acoustic transducer T1 can be seen more clearly. Increasing the sensor distance from the optimal value causes an increase in the transit time between the acoustic transducers because the transit time in the pipe wall is increased. This can be compensated, however, because the transit time through the pipe wall t_pipe can be calculated from the wave propagation speed in the pipe wall c_pipe and the additional distance x_pipe:

$$t\_pipe = x\_pipe/c\_pipe \qquad \text{Eq. (10)}$$

The sound transit time t_fl in the fluid is obtained from the total transit time t from the transmitting acoustic transducer to the receiving acoustic transducer and the transit time tdelay through the acoustic transducer wedges and the electronics and the transit time in the pipe wall t_pipe as $$t\_fl = t - t\text{delay} - t\_pipe \qquad \text{Eq. (11)}$$

In addition, the following applies to t_fl:

$$t\_fl = 2d/\cos(\text{gamma})/c\_fl \qquad \text{Eq. (12)}$$

The propagation path x_pipe in the pipe wall is obtained from the distance x0 between the sound entry and the sound exit in the pipe wall and the propagation path x_fl in the fluid. The path x_fl depends on the inside diameter d of the pipe and depends tangentially on the angle of incidence gamma in the fluid. Snell's law of refraction and the corresponding trigonometric relationships are used as a basis. The sound velocity in the fluid c_fl is then calculated according to:

$$c\_fl = c\_pipe 2d / \sqrt{((t - t\text{delay})c\_pipe)_2 - x0 + 4d^2} \qquad \text{Eq. (13)}$$

The sound transit time in the fluid t_fl can then also be calculated using Eq. (12).

The surface wave modes are particularly suitable for transmitting the ultrasonic signals from the acoustic transducer into the medium and thereby also creating a propagation in the direction of the longitudinal axis of the pipe. In principle, however, other so-called plate modes in the pipe wall can also be used. The modes dominating the sound propagation in the pipe wall are determined by the angle of incidence and the sound velocity of the acoustic transducers and the sound velocity and the thickness of the pipe wall.

Figure 6:
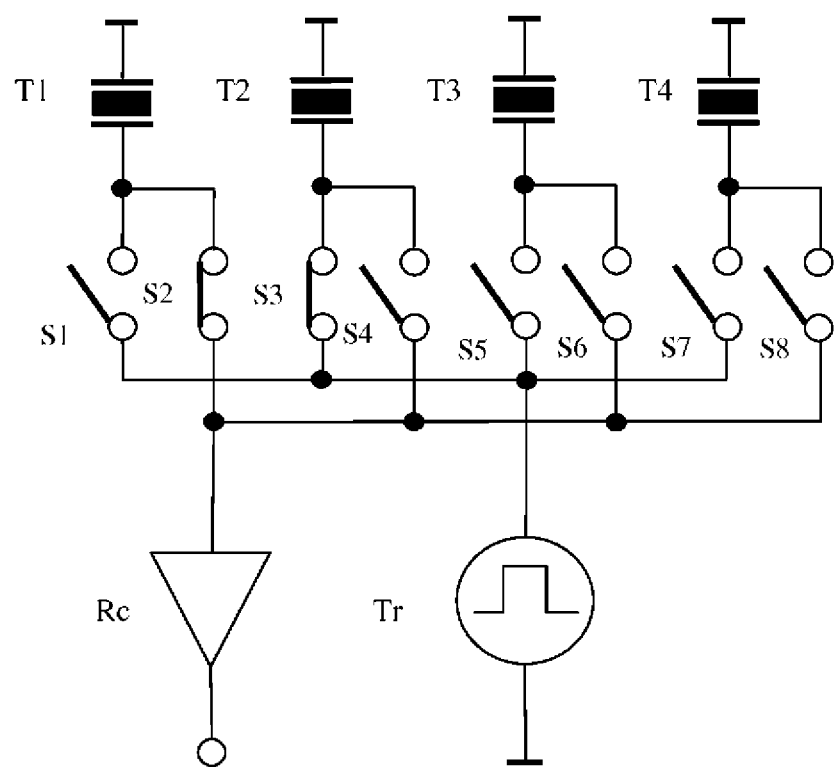
FIG. 6 shows a circuit arrangement for controlling the acoustic transducers.

A measuring transducer, which controls the four acoustic transducers T1, T2, T3, and T4, of which two each realize a sound path, is necessary for operating the two reflection configurations and the X configuration according to the invention. FIG. 6 shows a possible circuit arrangement for controlling acoustic transducers T1, T2, T3, and T4. The circuit includes a signal transmitter Tr, as well as eight switching elements S1-S8 and an amplifier Rc, apart from the four acoustic transducers T1, T2, T3, and T4. Signal transmitter Tr is connected via switching elements S1, S3, S5, and S7 to acoustic transducers T1, T2, T3, and T4. If acoustic transducers T1, T2, T3, and T4 are controlled by an excitation pulse (for example, by a rectangular pulse), they function as an acoustic transmitting unit. Furthermore, switching elements S2, S4, S6, and S8 connect acoustic transducers T1, T2, T3, and T4 to amplifier Rc. The desired transmit/receive pairs (X configuration or reflection configurations) are realized by an appropriately controlled actuation of the switching elements. For a first measurement, top left acoustic transducer T1 and bottom right acoustic transducer T2 are connected via switching elements S2, S3 (FIG. 6) and then top right acoustic transducer T3 and bottom left acoustic transducer T4 are connected via switching elements S6 and S7 to form one transmit/receive pair each and an X configuration is realized thereby, whereby bottom right acoustic transducer T2 and bottom left acoustic transducer T4 are wired as transmitting units and top left acoustic transducer T1 and top right acoustic transducer T3 as receiving units. For a second measurement, top left acoustic transducer T1 and top right acoustic transducer T3 and bottom right acoustic transducer T2 and bottom left acoustic transducer T4 are connected via switching elements S2, S5, S3, and S8 to form one transmit/receive pair each and two reflection configurations are realized thereby.

The two reflection configurations and the X configuration can therefore be realized by different operating modes of the measuring transducer in the case of an unchanged acoustic transducer configuration.

To carry out the method in a first embodiment, top left acoustic transducer T1 and bottom right acoustic transducer T2 are arranged diametrically opposite to top right acoustic transducer T3 and bottom left acoustic transducer T4. They are operated alternately in the X configuration and in the reflection configuration. It must be considered in this case that the maximum allowable flow velocities of both configurations are different, whereby the maximum allowable flow velocity for the X configuration is always greater. A measurement in the X configuration occurs first, whereby the average flow velocity and the cross-flow component are determined. If the thus determined flow velocity is lower than the maximum flow velocity allowable for the reflection configuration, then the next measurement is operated in the reflection configuration; otherwise, the next measurement is again operated in the X configuration. The cross-flow component is stored as a diagnostic value and displayed. If the cross-flow component exceeds a predefined maximum value, a warning signal is generated.

A second embodiment includes arranging top left acoustic transducer T1 and bottom right acoustic transducer T2 and top right acoustic transducer T3 and bottom left acoustic transducer T4 as described for the first embodiment. For a second measuring plane, accordingly further acoustic transducers are arranged which are offset by 90° from one another in the direction of the pipe circumference. Thereby, measurements are taken first in the two measuring planes consecutively in the X configuration, and the average flow velocity of the two measuring planes and the value or the angle of the vector of the cross-flow component are calculated from the average flow velocities measured in the two measuring planes. If the average flow velocity is lower than the maximum flow velocity allowable for the reflection configuration, then the next measurement is run in both measuring planes in the reflection configuration; otherwise, the next measurement is again run in both measuring planes in the X configuration. The value and the angle of the vector of the cross-flow component can be stored as a diagnostic value and displayed. If the value and/or the angle of the cross-flow component exceed a predefined maximum value, a warning signal can be generated.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for an ultrasonic clamp-on flow measurement according to a transit time method, the method comprising:
   arranging four acoustic transducers on a measurement pipe;
   controlling the four acoustic transducers by a control unit such that the flow measurement is performed consecutively in an X configuration and in a reflection configuration,
   wherein a first flow measurement is performed in the X configuration, in which at least one average flow velocity is determined, if the average flow velocity is lower than a maximum flow velocity allowable for the reflection configuration, a second flow measurement is performed in the reflection configuration, or if the average flow velocity is greater than or equal to the maximum flow velocity allowable for the reflection configuration, the first slow measurement is repeated in the X configuration.

2. The method according to claim 1, wherein in each case two top, adjacent right and left acoustic transducers lie opposite to two bottom, adjacent right and left acoustic transducers, and the top left acoustic transducer is connected to the bottom right acoustic transducer and the top right acoustic transducer to the bottom left acoustic transducer to form one transmit/receive pair each for a flow measurement in the X configuration and the top left acoustic transducer is connected to the top right acoustic transducer and the bottom left acoustic transducer to the bottom right acoustic transducer to form one transmit/receive pair each for two reflection configurations.

3. The method according to claim 1, wherein an average flow velocity and a cross-flow component are determined, whereby the cross-flow component is stored as a diagnostic value and displayed, and a warning signal is generated when a predefined maximum value of the cross-flow component is exceeded.

4. An arrangement for the ultrasonic clamp-on flow measurement according to a transit time method, the arrangement comprising:
   four acoustic transducers arranged on a measurement pipe, the four acoustic transducers being arranged diametrically opposite to each other in pairs on the measurement pipe; and
   a control unit for the flow measurement both in a reflection configuration and in an X configuration,
   wherein the control unit performs a first flow measurement in the X configuration, in which at least one average flow velocity is determined, wherein if the average flow velocity is lower than a maximum flow velocity allowable for the reflection configuration, the control unit performs a second flow measurement in the reflection configuration, or if the average flow velocity is greater than or equal to the maximum flow velocity allowable for the reflection configuration, the control unit repeats the first flow measurement in the X configuration.

5. The arrangement according to claim 4, wherein in each case two top, adjacent right and left acoustic transducers lie opposite to the two bottom, adjacent right and left acoustic transducers, and the bottom left acoustic transducer is arranged diametrically opposite to the top left acoustic transducer and the bottom right acoustic transducer to the top right acoustic transducer on the measurement tube and depending on the control by the control unit, the top left acoustic transducer and the top right acoustic transducer and the bottom left acoustic transducer and the bottom right acoustic transducer in each case form a transmit/receive pair for the flow measurement in the reflection configuration and the top left acoustic transducer and the bottom right acoustic transducer and the top right acoustic transducer and the bottom left acoustic transducer in each case form a transmit/receive pair for the flow measurement in the X configuration.

6. A circuit arrangement for controlling an ultrasonic clamp-on flow measurement according to a transit time method, the arrangement comprising:
   four acoustic transducers arranged on a measurement pipe, the four acoustic transducers being arranged diametrically opposite to one another in pairs on the measurement pipe; and
   a signal transmitter connected via switching elements to the four acoustic transducers and an amplifier connected via the switching elements to the four acoustic transducers,
   wherein, for a first flow measurement, a top left acoustic transducer is connected via the switching elements to a bottom right acoustic and then a top right acoustic transducer is connected via the switching elements to a bottom left acoustic transducer to form one transmit/receive pair each so that the bottom right acoustic transducer and the bottom left acoustic transducer are wired as transmitting units and the top left acoustic transducer and the top right acoustic transducer are wired as receiving units, and a flow measurement in an X configuration is realized thereby,
   wherein, for a second flow measurement, the top left acoustic transducer and the top right acoustic transducer are connected via the switching elements and the bottom right acoustic transducer and the bottom left acoustic transducer are connected via the switching elements to form one transmit/receive pair each and the flow measurement in a reflection configuration is realized thereby, and
   wherein the first flow measurement in the X configuration, at least one average flow velocity is determined, wherein if the average flow velocity is lower than a maximum flow velocity allowable for the reflection configuration, the second flow measurement in the reflection configuration is performed, or if the average flow velocity is greater than or equal to the maximum flow velocity allowable for the reflection configuration, the first flow measurement is repeated in the X configuration.

* * * * *